Figure 1:
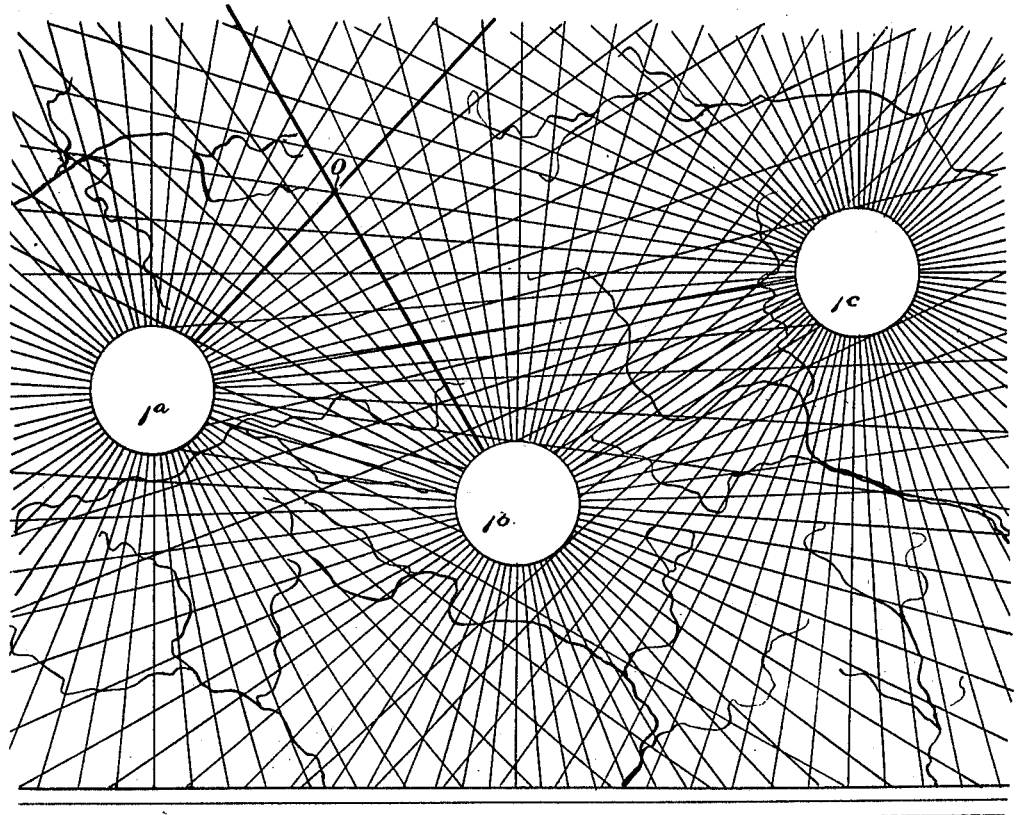

D. W. ADAMS.
RANGE FINDING APPARATUS.
APPLICATION FILED NOV. 26, 1910.

1,003,854.

Patented Sept. 19, 1911.
2 SHEETS—SHEET 1.

Witnesses
J. Adolph Bishop
James Fitz Gibbon

Inventor
Daniel W. Adams,
By
Eugene C. Brown
Attorney

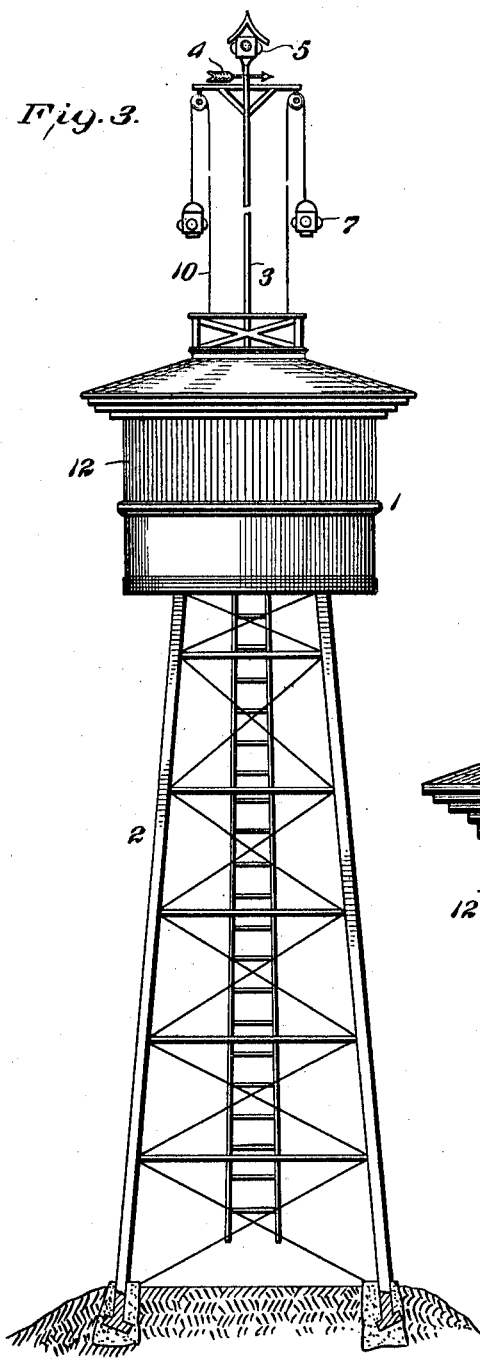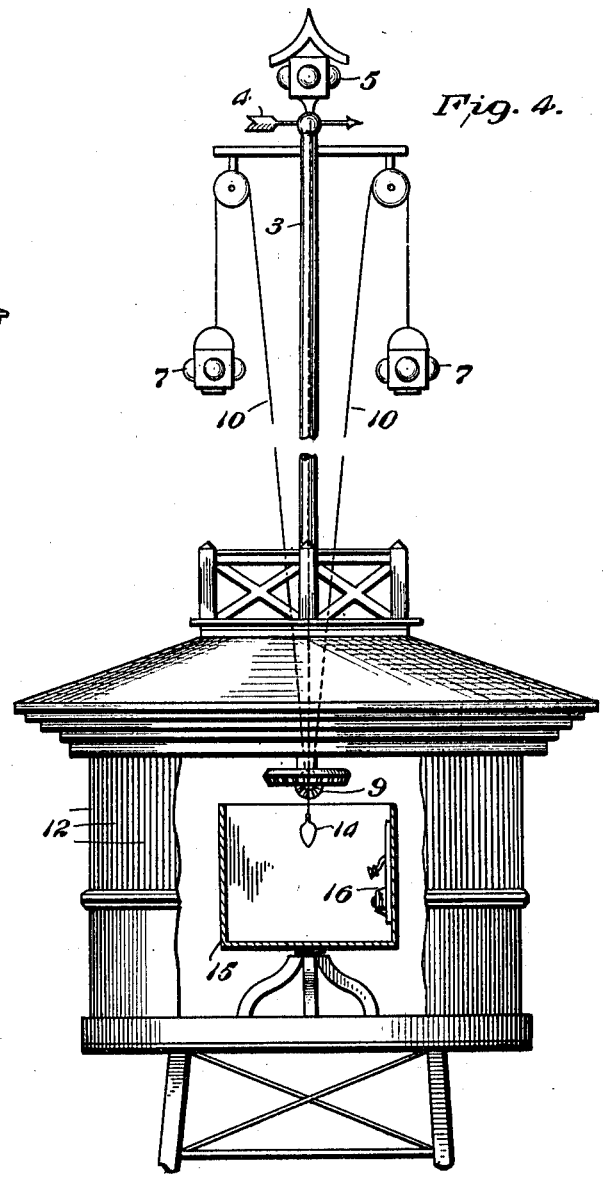

UNITED STATES PATENT OFFICE.

DANIEL W. ADAMS, OF GLENDALE SPRINGS, NORTH CAROLINA.

RANGE-FINDING APPARATUS.

1,003,854.  Specification of Letters Patent.  Patented Sept. 19, 1911.

Application filed November 26, 1910. Serial No. 594,353.

*To all whom it may concern:*

Be it known that I, DANIEL W. ADAMS, a citizen of the United States, residing at Glendale Springs, in the county of Ashe and State of North Carolina, have invented new and useful Improvements in Range-Finding Apparatus, of which the following is a specification.

My invention relates to range finders and to a method of determining with accuracy and without the use of surveying instruments or mathematical computations, the exact location of an object and is particularly adapted to locating a forest fire.

It is customary upon large forest reservations to employ watchers or rangers who are constantly upon the lookout for any fires that may occur, and whose duty it is to immediately hasten to the scene of the fire for the purpose of extinguishing it before it has gained any considerable headway. It is well known that the apparent distance to a fire is very deceptive, rendering it exceedingly difficult to determine the location with any degree of exactness. For this reason much time is often lost in the endeavor to find the fire, especially when it occurs in a dense forest, and very frequently the fire is permitted to gain such a headway that it is of great magnitude or beyond control by the time it is reached by the rangers.

It is the object of my invention to provide a method of locating objects with great accuracy and by means of apparatus which is extremely simple, requiring no skill, special ability or previous training to use.

For the purpose of taking observations, I provide a number of range-finder lookout towers or stations, preferably located upon hill-tops or mountains when available, and which may be placed at convenient distances apart, such as twenty miles. Communication is established between the several stations preferably by means of telephones, but in case of necessity by means of the heliograph and of signal lanterns. Supported between a peripheral railing and the roof of each signal-tower, I arrange a number of vertical range wires, preferably spaced two and one-half degrees apart, corresponding to deflections on a signal station map, and in the center of the tower is suspended a plumb line or bob. When a fire is discovered, the ranger or watchman on guard sights the smoke arising on a line with the plumb bob and one of the vertical wires, and signals to the attendant at the next adjacent station, giving him the particular number of the wire in his sight. This attendant immediately sights the smoke in the same manner and communicates the number of his wire to the first watchman. By means of a map of the district showing the location of the signal watch towers and the range-lines radiating from each station, corresponding with the vertical wires, the watchmen in these two stations can instantly locate the fire at the intersection of the two radiating range lines, and can despatch a party provided with fire fighting apparatus. By means of my method the fires can be located with precision as soon as the first smoke rises.

My invention will be clearly understood from the following description in connection with the accompanying drawings, in which—

Figure 2:
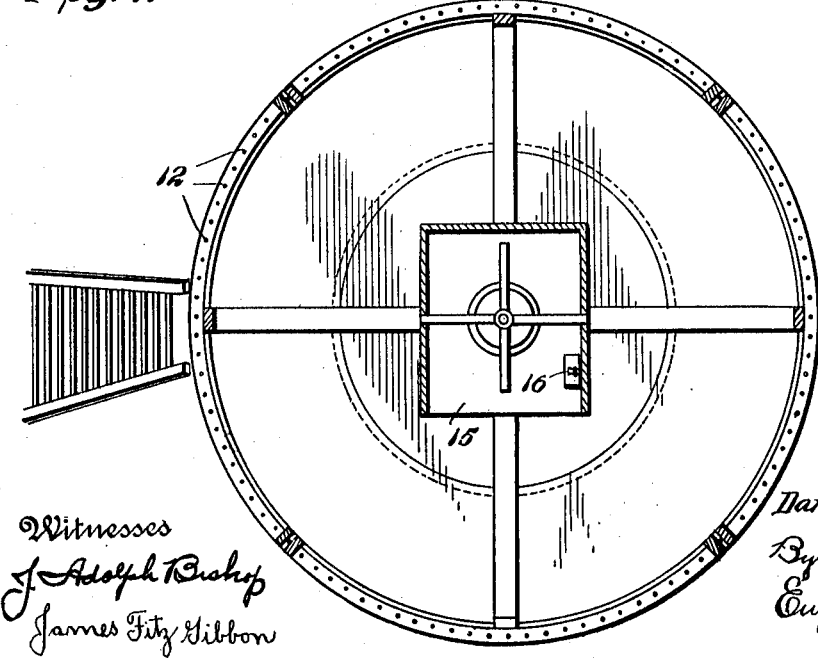

Figure 1 represents a map of some district, showing the location of the range-finder signal towers, and having indicated thereon the range limits radiating from the center of each tower in alinement with the several vertical wires; Fig. 2 is a horizontal cross-section through one of the signal towers; Fig. 3 is a side elevation of one of the towers; and Fig. 4 is a detail view of the same, with a section of the side railing and vertical wires broken away to show the interior arrangement.

The towers 1 are supported upon high platforms to raise them above the surrounding objects and permit an unobstructed view of the landscape in all directions. I have shown the tower supported upon a skeleton framework 2, but it is evident that the supporting structure may be inclosed or sheathed and be provided with a stair-case within the structure. Surmounting the tower is a hollow metal mast 3, which may be pivotally mounted to turn in any direction. A rod or wire passes through the mast, to which the wind-vane 4 and revoluble lamp 5 are secured, and may carry a pointer on the lower end to indicate to the watchman within the observatory the direction of the wind. Signal lamps 7, suspended from a cross arm on the mast, may be raised or lowered for the purpose of giving different signal indications, by means of gearing 9 or lamp operating device connected with the ropes 10.

An annular series of equally spaced vertical degree or sighting wires 12, are supported around the periphery of the tower between the roof and the side railing. I have found it convenient to employ one hundred and forty-four wires spaced two and one-half degrees apart, corresponding to deflections on a signal station map, the wires being numbered consecutively around the tower. In the center of the tower is suspended a plumb bob 14.

I have found it convenient to provide a revoluble chair 15 for the watchman or ranger, which is located in the center of the tower and may be provided with closed sides and back to furnish protection from the weather. The solid sides of the chair provide convenient supports for the telephone 16 and the district map respectively.

The manner in which my apparatus is employed in locating fires will be understood from the foregoing description.

When the watchman dicovers smoke rising at any point, he sights the smoke across the plumb line and the intervening vertical wire. He notes the number assigned to that wire, and communicates with the watchman in the adjacent tower in the direction of the fire, giving him the wire number. That watchman immediately takes a corresponding observation and communicates his wire number to the first watchman. Each man then examines his map and locates the fire at the intersection of the two range lines. Thus, if the watchman at signal tower 1$^a$ discovers smoke in the range line corresponding, for instance, with his vertical wire numbered 25, and the watchman in tower 1$^b$ finds the smoke on range line corresponding with his wire numbered 122, each man would at once know that the fire was located at the point indicated by 0 in Fig. 1. It is, therefore, possible by means of my method of locating fires, to despatch the rangers with fire-extinguishing apparatus to the exact place where the fire exists.

The vast importance of my invention will be especially appreciated by those who have had experience in forestry service, and have experienced the great difficulty of locating fires which occur in forests. The element of time is a most important factor in fighting fires, since the moments lost in the endeavor to find the fire may result in producing a conflagration which is beyond control and which if reached in time would have been readily extinguished. The simplicity of the apparatus and the manner of using it enables even the ignorant or inexperienced to locate fires with exactness and despatch.

It will be evident to engineers that my invention is adapted to many uses where it is desired to determine the range or location of an object.

While I have described the particular arrangement of apparatus disclosed in the drawings in detail for the purpose of illustrating an embodiment of my invention, it will be evident to engineers and to those skilled in this art that many changes may be made therein without departing from the spirit of my invention and the scope of my claims, which are—

1. Apparatus for determining ranges comprising a signal station having a central sight member and a series of regularly spaced sight elements concentric therewith.

2. Apparatus for determining ranges comprising a signal station having a central sight member and a series of vertical regularly spaced wires or filaments concentric therewith.

3. Apparatus for determining ranges in a district comprising a plurality of signal stations or towers, each tower being provided with a central sight member, and an annular series of regularly spaced sight elements, said elements being correspondingly designated in the several towers, whereby an object may be precisely located by determining the point of intersection of sight lines passing through the object and sight elements on a plurality of said towers.

4. Apparatus for determining ranges in a district comprising a plurality of signal stations or towers, each tower being provided with a central sight member and an annular series of regularly spaced sight elements, said elements being correspondingly designated in the several towers, and locating-means provided with intersecting sight-lines corresponding to said sight elements, whereby an object may be precisely located by determining the intersection of the sight lines upon the locating-means corresponding with the sight elements in alinement with the object in a plurality of towers.

In testimony whereof I have hereunto set my hand in presence of two subscribing witnesses.

DANIEL W. ADAMS.

Witnesses:
  A. B. WERTZ,
  J. R. RUST.